United States Patent Office 3,755,417
Patented Aug. 28, 1973

3,755,417
TRIS (4-CHLOROPHENOXY)ACETIC ACID
AND ESTERS THEREOF
Charles J. Guinosso, Abington, Pa., assignor to American Home Products Corporation, New York, N.Y.
No Drawing. Filed Oct. 4, 1971, Ser. No. 186,556
Int. Cl. C07c 69/76
U.S. Cl. 260—473 G                                   2 Claims

ABSTRACT OF THE DISCLOSURE

The invention concerns novel oxalic monoorthoacid monoesters and their method of preparation. The products are useful as lipid shifting agents.

---

The invention relates to new and useful oxalic monoorthoacid monoesters having the general formula

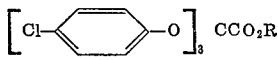

where R is hydrogen, lower alkyl, and N-lower alkyl piperid-4-yl.

The term lower alkyl as used herein includes radicals having from one to eight carbon atoms in a straight or branched chain.

The most closely related prior art is believed to be Ya. N Ivashchenko, S. D. Moshchitskii. Zh. Obshch. Khim. 33(5), 1412–1414 (1963) (CA 59: 11319e) which concerns esters of diaryloxy monoalkoxy acetic acids. Sandoz S. A. Bel. 740,392. (Apr. 6, 1970) (Derwent 27178R) which concerns hypocholesterolaemichypolipaemic bis-(phenoxy)-acetic acids and derivatives.

The compounds of this invention may be prepared and utilized according to the following synthetic procedure

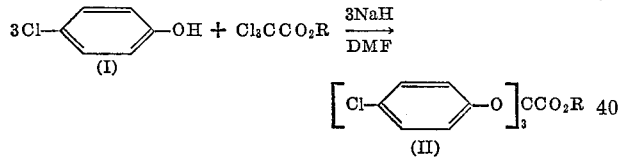

where R is as defined above.

The starting materials of the invention p-chlorophenol and trichloroacetic esters are well known in the art and readily available from commercial sources. In carrying out the procedure of the present invention p-chlorophenol is dissolved in a suitable solvent such as dimethylformamide and is added to a slurry of a salt forming agent such as sodium hydride in the same solvent. The mixture is stirred for one to six hours, preferably three hours at 0 to 95° C., preferably at room temperature. A trichloroacetic ester is added and stirred for 1 to 96 hours, preferably for about 72 hours at 0 to 95° C., preferably at room temperature. The product oxalic monoorthoacid monoester is then recovered by a well known means. For instance the reaction solution may be poured into a benzene-water mixture and then washed with water, 5 percent sodium hydroxide, water, brine and then dried with sodium sulfate. The solvent may be stripped off and any volatile materials removed by heating to 100° C. under a vacuum of 0.1 mm. mercury. The residue may be resolved in ether, charcoaled, and a filtrate stripped under vacuum to provide a crude product. The crude product may be recrystallized from methanol and from ethanol to yield the purified product.

As an alternate procedure, some members of the genus may be prepared by esterification of the parent acid or by ester interchange as is well known to those skilled in the art.

The product oxalic monoorthoacid monoesters have been found to have activity as lipid shifting agents.

In the pharmacological evaluation of the antilipemic activity of the compounds of the present invention, the in vivo effects are tested as follows. Male weanling rats are fed a hypercholesterolemic diet for three weeks. Serum cholesterol is determined on 0.01 milliliter of serum separated from tail blood collected in a capillary tube. Groups of rats with equal average serum cholesterol are given the test compound orally once a day by syringe for three days. Serum cholesterol is determined in the morning of the fourth day. Antilipemic activity is demonstrated by a lowering of the serum cholesterol. Potency is expressed as the percentage of activity of a test compound as compared with the activity of a concomitantly run standard such as Atromid-s. The oxalic monoorthoacid monesters of the present invention in the above procedure had 210 percent of the activity compared with that of Atromid-s.

In order more clearly to disclose the nature of the present invention, specific examples of the practice of the invention are hereinafter given.

EXAMPLE 1

This example illustrates the preparation of oxalic monoorthoacid, 1-ethyl 2,2,2-tris-(chlorophenyl)esters.

A solution of p-chlorophenol (41.4 g., 0.33 mole) in dimethylformamide (150 ml.) is added to a slurry of hexane washed sodium hydride (50 percent oil dispersion, 16 g., 0.33 mole) in dimethylformamide (300 ml.), and the mixture is stirred fo 3 hours at room temperature. Ethyl trichloroacetate (19.1 g., 0.1 mole) is added and stirred for 3 days at room temperature. The solution is poured into benzene-water, and the benzene washed well with water, 5 percent sodium hydroxide, water, brine and dried with sodium sulfate. The solvent is stripped off and any volatile materials are removed at 100°/0.1 mm. The residue is dissolved in ether and charcoaled. The filtrate is stripped under vacuum giving a yellow residue. The residue is crystallized once from methanol and once from ethyl-alcohol giving white crystals (4.0 g., 8 percent yield), having a melting point of 84–86° (uncorrected).

Based on the formula $C_{22}H_{17}Cl_3O_5$ it was calculated that the elemental analysis by weight would be 56.6 percent carbon, 3.64 percent hydrogen and 22.7 percent chlorine. The product was analyzed and the content found to be 56.28 percent carbon, 3.58 percent hydrogen and 22.74 percent chlorine which confirmed the molecular formula. This may be expressed Analysis.—Calcd. for $C_{22}H_{17}Cl_3O_5$ (percent): C, 56.6; H, 3.64; Cl, 22.7. Found (percent): C, 56.28; H, 3.58; Cl, 22.74.

The product oxalic monoorthoacid, 1-ethyl 2,2,2-tris (p-chlorophenyl)ester when evaluated in the foregoing pharmacological procedure showed an activity of 210 percent of the activity of Atromid-s.

EXAMPLES 2–6

Following the procedure of Example 1 but substituting the appropriate starting materials the following products are afforded.

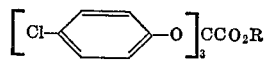

where R is—

Example 2: H-hydrogen
Example 3: CH₃-methyl
Example 4: C₂H₅-ethyl
Example 5: —N—Me  N-methylpiperid-4-yl
Example 6: —N—Et  N-ethylpiperid-4-yl The terms and expressions which have been employed are used as terms of description and not of limitation, there is no intention in the use of such terms and expressions of excluding any equivalent of the features shown and described or portions thereof, but it is recognized that various modifications are possible within the scope of the invention claimed.

What is claimed is:

1. A compound having the formula

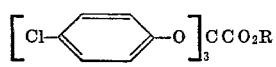

where R is hydrogen, lower alkyl, and N-lower alkyl piperid-4-yl.

2. A compound as defined in claim 1 which is oxalic monoorthoacid, 1-ethyl 2,2,2-tris(p-chlorophenyl)ester.

References Cited

UNITED STATES PATENTS

| | | | |
|---|---|---|---|
| 3,097,139 | 7/1963 | Thorp | 260—521 R |
| 3,454,581 | 7/1969 | Griot | 260—473 G |

LORRAINE A. WEINBERGER, Primary Examiner

J. F. TERAPANE, Assistant Examiner

U.S. Cl. X.R.

260—293.82, 520; 424—267, 308, 317